Patented July 3, 1934

1,965,072

UNITED STATES PATENT OFFICE 1,965,072

MANUFACTURE OF OXYGEN-CONTAINING ALIPHATIC COMPOUNDS

Henry Dreyfus, London, England

No Drawing. Application October 30, 1930, Serial No. 492,361. In Great Britain November 28, 1929

18 Claims. (Cl. 260—134)

This invention relates to the production of ketones from aliphatic primary alcohols containing at least two carbon atoms, and especially to the production of acetone from ethyl alcohol.

According to the invention I have found that aliphatic ketones may be prepared in a highly satisfactory manner, by subjecting the vapors of the primary aliphatic alcohols, in admixture with water vapor, to the action of high or relatively high temperatures in the presence of a catalyst mass comprising zinc, i. e. a catalyst mass containing zinc and/or one or more salts or compounds of zinc. The catalyst or catalyst mass may also advantageously contain one or more alkali or preferably earth alkali oxides, hydroxides or salts, such as carbonates or other salts and especially salts of the weaker acids, such for instance as silicates or borates.

By means of the invention acetone can readily be produced from ethyl alcohol and homologous ketones can be produced from the homologous alcohols, e. g. diethyl ketone can readily be produced from propyl alcohol.

As examples of catalysts suitable for use in performing the invention may be mentioned metallic zinc, zinc acetate, zinc oxide, zinc carbonate; mixtures of two or more of such bodies; one or more of such bodies in admixture or association with one or more oxides, hydroxides or salts (e. g. carbonates, borates, silicates) of calcium, barium, magnesium or other earth alkali metals.

The catalysts may, if desired, be employed spread upon or deposited upon filling or contact materials, such for instance as pumice, kieselguhr or the like.

The reaction of the invention may be performed at temperatures between about 200–700° C. and especially at temperatures between about 400–550° C. The reaction may be performed at any desired pressure whether higher or lower than normal atmospheric, for instance under reduced pressure or "vacuum", or under higher pressures, such for instance as 3–10 atmospheres or more.

For the purposes of the invention I preferably employ mixtures of the alcohol vapor and steam containing relatively large amounts of steam or water vapor, e. g. amounts such as 2–10 or more times the volume of the alcohol vapor present. I may also mix with the alcohol vapor and water vapor, oxygen or a gaseous mixture containing the same, such for instance as air. For instance, I may mix oxygen or a gas containing the same in a relatively large amount, such for instance as 2–5 times or more the volume of the alcohol vapor present, though it is, of course, to be understood that I may employ smaller quantities of such gases or operate in the absence of such gases. If desired, the mixture of alcohol vapor and water vapor, whether or not such mixture contains oxygen or a gas containing the same, may contain indifferent gases such for instance as nitrogen, carbon dioxide and the like. The mixture of the alcohol vapor and water vapor, containing or not containing the gases or gaseous mixtures such as aforesaid, may be submitted to the reaction in any convenient way, as for instance the mixture may be passed in a rapid stream through a tube or other form of apparatus (e. g. a tube or apparatus of copper, iron, staybrite, earthenware, or the like) filled or provided with a catalyst and heated to the desired temperature.

The following example serves to illustrate a convenient form of operation of the invention, but it is to be understood that the invention is in no way limited thereto.

Example

A mixture of ethyl alcohol steam and oxygen in the proportions of 1:5:1 by volume is passed in a rapid stream over or in contact with the catalyst contained in a tube (e. g. of copper) and maintained at a temperature of between about 475 and 485° C. The catalyst is composed of zinc acetate or of zinc oxide and calcium silicate, e. g. a mixture of two molecular proportions of zinc oxide with one molecular proportion of calcium silicate.

The resulting acetone can, if desired, be purified by frictional distillation.

What I claim and desire to secure by Letters Patent is:—

1. Process for the manufacture of an aliphatic ketone, which comprises subjecting the vapor of a primary aliphatic alcohol containing at least two carbon atoms to reaction with steam at an elevated temperature in presence of a catalyst mass comprising essentially zinc and which is free from other heavy metals.

2. Process for the manufacture of an aliphatic ketone, which comprises subjecting the vapor of a primary aliphatic alcohol containing at least two carbon atoms to reaction with steam at an elevated temperature in presence of a catalyst mass consisting of at least one substance selected from the group consisting of metallic zinc and compounds of zinc.

3. Process for the manufacture of an aliphatic ketone, which comprises subjecting the vapor of a primary aliphatic alcohol containing at least two carbon atoms to reaction with steam at an elevated temperature in presence of a catalyst mass comprising essentially a compound of zinc and a compound of an earth alkali metal.

4. Process for the manufacture of an aliphatic ketone, which comprises subjecting the vapor of a primary aliphatic alcohol containing at least two carbon atoms to reaction with steam at a temperature between 200 and 700° C. in presence of a catalyst mass comprising essentially zinc and which is free from other heavy metals.

5. Process for the manufacture of an aliphatic ketone, which comprises subjecting the vapor of a primary aliphatic alcohol containing at least two carbon atoms to reaction with steam at a temperature between 200° and 700° C. in presence of a catalyst mass consisting of at least one substance selected from the group consisting of metallic zinc and compounds of zinc.

6. Process for the manufacture of an aliphatic ketone, which comprises subjecting a mixture of between 2 and 10 volumes of steam and 1 volume of the vapor of a primary aliphatic alcohol containing at least two carbon atoms to reaction at an elevated temperature in presence of a catalyst mass consisting of at least one substance selected from the group consisting of metallic zinc and compounds of zinc.

7. Process for the manufacture of acetone, which comprises subjecting the vapor of ethyl alcohol to reaction with steam at an elevated temperature in presence of a catalyst mass comprising essentially zinc and which is free from other heavy metals.

8. Process for the manufacture of acetone, which comprises subjecting the vapor of ethyl alcohol to reaction with steam at an elevated temperature in presence of a catalyst mass consisting of at least one substance selected from the group consisting of metallic zinc and compounds of zinc.

9. Process for the manufacture of diethyl ketone, which comprises subjecting the vapor of propyl alcohol to reaction with steam at an elevated temperature in presence of a catalyst mass comprising essentially zinc.

10. Process for the manufacture of acetone, which comprises subjecting the vapor of ethyl alcohol to reaction with steam at a temperature between 200° and 700° C. in presence of a catalyst mass consisting of at least one substance selected from the group consisting of metallic zinc and compounds of zinc.

11. Process for the manufacture of acetone, which comprises subjecting the vapor of ethyl alcohol to reaction with steam at a temperature between 400° and 550° C in presence of a catalyst mass comprising essentially a compound of zinc and a compound of an earth alkali metal.

12. Process for the manufacture of acetone, which comprises subjecting a mixture of between 2 and 10 volumes of steam and 1 volume of ethyl alcohol vapor to reaction at a temperature between 400° and 550° C. in presence of a catalyst mass comprising essentially a compound of zinc and a compound of an earth alkali metal.

13. Process for the manufacture of diethyl ketone, which comprises subjecting the vapor of propyl alcohol to reaction with steam at a temperature between 200° and 700° C. in presence of a catalyst mass comprising essentialy zinc.

14. Process for the manufacture of diethyl ketone, which comprises subjecting the vapor of propyl alcohol to reaction with steam at a temperature between 400° and 550° C. in presence of a catalyst mass comprising essentially a compound of zinc and a compound of an earth alkali metal.

15. Process for the manufacture of diethyl ketone, which comprises subjecting a mixture of between 2 and 10 volumes of steam and 1 volume of propyl alcohol vapor to reaction at a temperature between 400° and 550° C. in presence of a catalyst mass comprising essentially a compound of zinc and a compound of an earth alkali metal.

16. Process for the manufacture of acetone, which comprises subjecting the vapor of ethyl alcohol to reaction with steam at a temperature between 400° and 550° C. in presence of a catalyst composed of zinc oxide and a compound of an earth alkali metal.

17. Process for the manufacture of acetone, which comprises subjecting the vapor of ethyl alcohol to reaction with steam at a temperature between 475° and 485° C. in presence of a catalyst composed of zinc oxide and calcium silicate.

18. Process for the manufacture of acetone, which comprises subjecting a mixture of between 2 and 10 volumes of steam and 1 volume of ethyl alcohol vapor to reaction with a catalyst composed of zinc oxide and calcium silicate at a temperature between 475° and 485° C.

HENRY DREYFUS.